ELECTRONIC DIGITIZING CIRCUITS

Filed March 11, 1963 3 Sheets-Sheet 1

Inventor:
John F. Flood.
By Merriam, Smith, & Marshall,
Attys.

Inventor.
John F. Flood.
By Merriam, Smith, & Marshall.
Attys.

Inventor:
John F. Flood.
By Merriam, Smith & Marshall,
Attys.

3,210,756

ELECTRONIC DIGITIZING CIRCUITS

John F. Flood, Anaheim, Calif., assignor to Interstate Electronics Corporation, Anaheim, Calif., a corporation of California Filed Mar. 11, 1963, Ser. No. 264,265
5 Claims. (Cl. 340—347)

This invention relates to apparatus for converting analog voltages or signal information to digital information usable in various forms of circuitry.

In the proposed form of apparatus, a transducer-generated analog voltage conversion proceeds by parallel approximation in a way which rapidly follows discontinuous input wave forms. Conversion takes place through the use of solid state components providing a resolution of at least ±½ bit.

In the broadest sense, the apparatus herein to be described and claimed comprises, in combination, a conversion circuit, a sampler circuit, a triggering circuit and a read-out circuit component. Binary data are supplied in parallel to the input of a sampler circuit. The sampler circuit provides storage so that the desired signal is available at selected triggering times. This sampler circuit also controls the supply of the binary data to a conversion circuit which functions to convert the normal binary informttion input into the selected type of reflected binary information which is stored. With the aid and control of a gating circuit, the reflected binary information is supplied to a load circuit for utilization or is reconverted either to normal binary data or, where desired, to any digital form.

Circuitry of the foregoing type is capable of operating at high speed. In one form of device the input signal may change at rates up to the order of 1000 volts per second and yet extremely rapid response information conversion accurately related to that which the converter is tracking is obtainable. This is possible because of the high circuit response speed obtainable by the utilization of solid state components through which the total periods of discontinuity are less than 15 microseconds as a maximum. Since the usefulness of such apparatus is often determined by the total time period required for conversion plus the read-out time, substantially greater utility is obtainable without efficiency sacrifice.

The apparatus herein disclosed utilizes circuitry which provides a parallel approximation by which the conversions may be had. In the usual sense, the analog information is converted into a straight binary information in any desired fashion, as is known in the art. In this operation information is derived from an analog-to-binary converter which provides a binary output of a form selected according to the different powers of 2. Different parallel input paths of the circuitry utilized to convert the binary information to a reflected binary provide that the information will be available on various parallel inputs which represent $2^0, 2^1, 2^2 \ldots 2^n$.

In the usual form of binary signal information the output is represented by the presence of a voltage level or the absence of a voltage level compared to some chosen base. It is well known that in proceeding through binary designations of various decimal quantities, frequently more than a single condition of change occurs at any selected incident, for instance, in the change from 3 to 4. The result is that a binary output is available where the chance for error in converting to a digital relationship is greater than would be the case if only a single one of the total number of quantities present were to change. In the operation here to be set forth, the analog information which produces the binary signal must have certain known derivatives, such as a certain rise in voltage per unit time period, and this must be less than some predetermined maximum.

The circuitry with which this invention is primarily concerned converts such analog information first into a cyclically varying binary signal and then from this information into a reflected binary signal which has only one digit changing for any unit change in any selected number produced. With the production of the reflected binary information the resultant signal condition in the several parallel signal channels is such that a change between an "on" and a "off" condition occurs in only one of the parallel circuits at any instant. Each of the several parallel channels includes an appropriate filtering circuit through which the reflected binary signals are passed to be stored asynchronously in a storage circuit. The stored information is selectively and simultaneously released from the storage circuit under the influence of a triggering pulse functioning under control of a "sample command" control pulse. Following the selective and simultaneous release of all stored information, the signals will provide digital information directly or may be reconverted to straight binary signals and thence into digital information. The control is one which practically precludes errors due to sampling of the dynamic signals.

By the circuitry herein set forth the periods of uncertainty are effectively removed in parallel binary data which varies in a continuous manner, such as the output from a dynamic parallel approximation analog to digital converter.

As a result of the foregoing conditions, one of the primary objectives of this invention is that of providing circuitry which will sample monatonically varying parallel binary information or data with non-zero intervals of carry, and to provide a highly efficient conversion circuit which is substantially free from errors due to changes in the code pattern and to filter the signal to remove uncertainties due to carry time. The invention also has for one of its objectives that of providing circuitry to insure accurate analog-to-digital conversion of input signal information at an efficiency greater than that heretofore achieved and at costs which are nominal. Other objectives will follow from what is herein described.

The invention in its preferred forms is discussed and has been illustrated by the accompanying drawings wherein.

Figure 1:
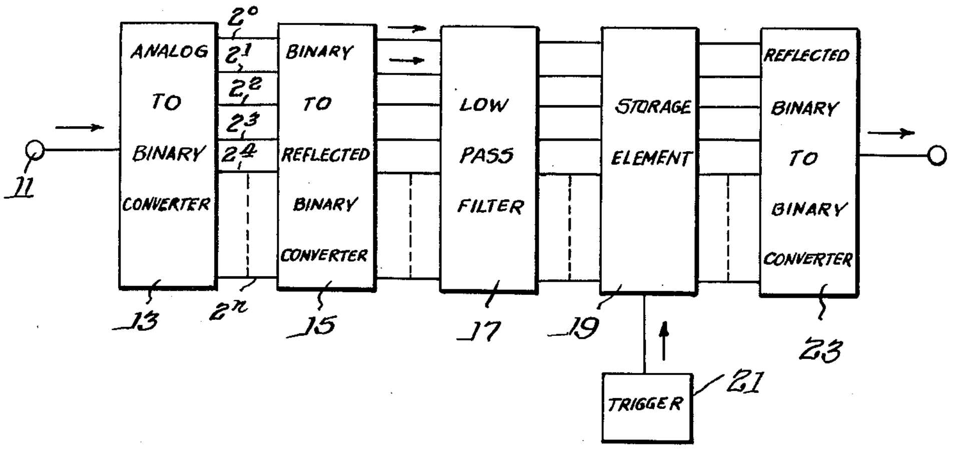
FIG. 1 is a schematic block diagram representing the disclosed circuit.

Referring now to the drawings for a further understanding of the invention and first to FIG. 1, analog information which may be continuously variable over its range is supplied at an input terminal 11 from which point it is fed to any well-known type of analog-to-binary converter, conventionally shown at 13. Various circuits to make this conversion are known in the art and details thereof will not herein be explained. Illustrative of one form of conversion circuit is found in the copending patent application of James H. Doyle, Serial No. 172,377, filed February 5, 1962, and entitled "Electronic Quantizer."

The operation and technique utilized has its main utility in connection with the parallel type of converters. So considered the output of the analog to binary converter 13 provides the various output signals in parallel relationship to represent binary signals indicative of $2^0$, $2^1$, $2^2$ and $2^3$ . . . $2^n$, where $n$ represents the number of bits into which selection is made. Such output signals are then supplied in parallel to a converter unit 15 which serves to convert the binary signals to reflected binary signals.

The normal binary signal information produces signal output at voltage levels or there is an absence of signal voltage levels departing from some selected base value in accordance with the table herein to follow. The table to follow also sets out the signal type which may be characterized as a reflected binary. The table relates each of these signals (whether straight binary or reflected binary) to a decimal signal. This relationship is represented as follows:

*Table I*

| Decimal | Binary | Reflected Binary |
|---|---|---|
| 0 | 0000 | 0000 |
| 1 | 0001 | 0001 |
| 2 | 0010 | 0011 |
| 3 | 0011 | 0010 |
| 4 | 0100 | 0110 |
| 5 | 0101 | 0111 |
| 6 | 0110 | 0101 |
| 7 | 0111 | 0100 |
| 8 | 1000 | 1100 |
| 9 | 1001 | 1101 |
| 10 | 1010 | 1111 |
| 11 | 1011 | 1110 |
| 12 | 1100 | 1010 |
| 13 | 1101 | 1011 |
| 14 | 1110 | 1001 |
| 15 | 1111 | 1000 |

In the operation as hereinabove described, the conversion of the binary signal information appearing at the output of the converter 13 into a form of reflected binary signals is provided in the converter unit 15. This is achieved by the combination of the circuitry designated further in FIG. 2 by the "exclusive-or" circuits of the character illustrated, for instance, in further detail by the circuitry of FIG. 3 supplying signals into a flip-flop circuit, such as that schematically designated by FIG. 6, through suitable filtering circuitry. The flip-flop circuitry is controlled by a so-called "sample command" or trigger 21. The outputs from the exclusive-or circuits supply the different parts of the flip-flops in opposite phase. The flip-flop circuits provide storage of the signal and are selectively triggered.

In the showing of FIG. 1 these components are schematically represented with the parallel outputs from the converted unit 15 being shown as supplied through the low-pass filter 17 into storage elements 19 which are triggered under the control of a sample command or trigger pulse separately developed in a triggering unit 21. The low-pass filter circuit 17 is desirable because in the transition period between changes in different conditions of the signal input, there is a non-zero carry time. Due to this finite period of change, the filter, which is a component normally used in an analog circuit, serves to remove ripple or high frequency effects which otherwise might be present in the signals impressed upon the storing circuits. If the circuit components had practically infinite band width it would usually be unnecessary to filter the supplied signals, but with the filter components in use any noise conditions which tend to come into being with changes of signal level between two binary conditions (indicative of either "0" or "1") can be substantially eliminated.

Such circuit control tends to make for foolproof operation of the circuitry. With this high fidelity of operation a more accurate resolution of the system is insured. The circuitry herein to be explained is of substantial significance in that through the components described, the digitizing occurs in such a fashion that at least at one selected step in the process, the range is greater than the remaining resolution at the next step. The filter component, as disclosed, constitutes essentially an analog-type low-pass filter element connected in series with the digital information supplied to the storage circuit. By the circuitry described, the digitizing occurs in such a way that there is always less than one-half bit of error at a maximum. In this respect it will be understood that the binary input has known derivatives, that is, the change in input signal per unit of time is less than some predetermined maximum. The filter, as described, with an input voltage which does not change at a rate greater than some set maximum value thereby serves to provide a control of the output series to remove any uncertaintities due to carry time. Signals in this form are then fed in parallel from the output of the flip-flop storage elements 19 into a further converter 23 which serves to convert the reflected binary information to binary signals and to provide an output which may, in essence, simulate that supplied from the unit 13. The circuitry as described provides for removing periods of uncertainty in parallel binary data varying in a continuous manner in the conversion to synchronous digital information.

In the sampling system, various time delays and times of uncertainty in signal conversion in inescapable. Under the circumstances, it is important to know the relative delays and uncertainty periods. To achieve this objective the time constant of the filtering components 17 should be relatively long with respect to the period of uncertainty, while, on the other hand, it should be relatively short with respect to the rate of change of the input data.

Considering the foregoing, what is involved is the sampling of a selected class of data as a parallel asynchronous signal. As the signal conditions so assumed are developed, and noting that the various signal inputs are shown at terminal points 25 to 34, inclusive, which, illustratively may be regarded as representative of $2^0$ through $2^9$, it will be noted that in the lower orders the binary information represented as $2^0$ is supplied to one terminal 25 of the exclusive-or circuit 37.

Figure 2:
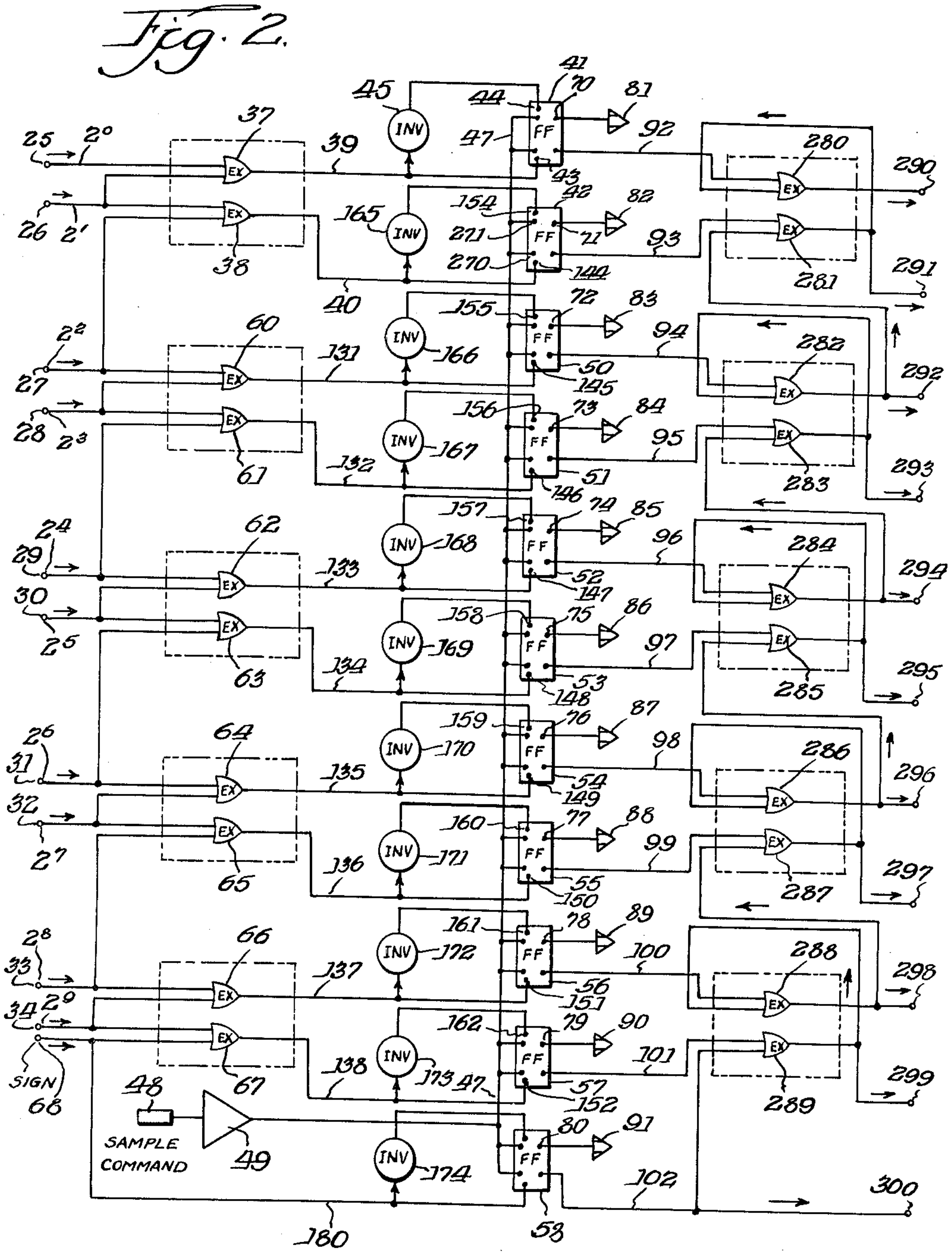
FIG. 2 is a second block diagram representing a ten-bit converter of the character herein set forth.

Reference may now be made to FIG. 2 for a further detailed consideration of the invention. In FIG. 2 various graphic symbols of known character are used to designate the components of the logic diagram. In FIG. 2 binary data representative of $2^1$, as available at terminal 26, are supplied to the second input terminal of the exclusive-or terminal 37 and to one input terminal of the exclusive-or terminal 38. The outputs from the exclusive-or circuits 37 and 38, illustratively, feed by conductors 39 and 40 to flip-flop circuits 41 and 42.

Considering first the flip-flop circuit 41, it will be noted that the signal avaliable on conductor 39, representing the output of the exclusive-or output 37, is supplied to one terminal 43 directly and to a second terminal 44 in an out-of-phase state by being connected through the inverter 45. The flip-flop circuit 41 (like other flip-flop circuits which will be mentioned) is controlled in its operation by a triggering pulse supplied through conductor 47. Triggering is thus under control of a sample command pulse (later to be described) developed in the unit 48 and supplied by way of the amplifier 49 to conductor 47, through which all of the flip-flops (later to be specifically identified) are simultaneously and synchronously triggered.

Each of the flip-flop circuits 41, 42 and 50 through 58 is similarly energized from one or another of the flip-flops 37, 38 and 60 through 67, except for the flip-flop 58 which is energized by the pulse available at the input terminal 68 which may be considered as a sign pulse which may be regarded as $2^n$ (this being $2^9$ in FIG. 2). In this form of circuitry the least significant information is that which is applied as a low order control signal and impressed illustratively at terminal 25 with that information which is available at terminal 58 being the highest order available. When signals are applied in this fashion, one of the outputs from the flip-flop circuits, such as those outputs available at terminal 70 through 80, inclusive, may be utilized to produce an output illustratively shown at the output devices 81 through 91. These devices may be in the form of display lights; they may be in the form of transducer components from which the derived signal information may be applied to tapes or other forms of records such as films or discs; or they may be of any desired form of tracking and sampling devices.

The second output from the flip-flops 41, 42 and 50 through 58 is supplied by way of an output conductor such as 92 through 102 as a control signal for succeeding circuitry, such as the exclusive-or type which will later be discussed. In this regard, it will be noted that the signal available at the output of the flip-flop 58 on conductor 102 corresponds to the signal input at terimnal 68 keyed in accordance with the sample command or trigger pulse avaliable on conductor 47.

Figure 3:
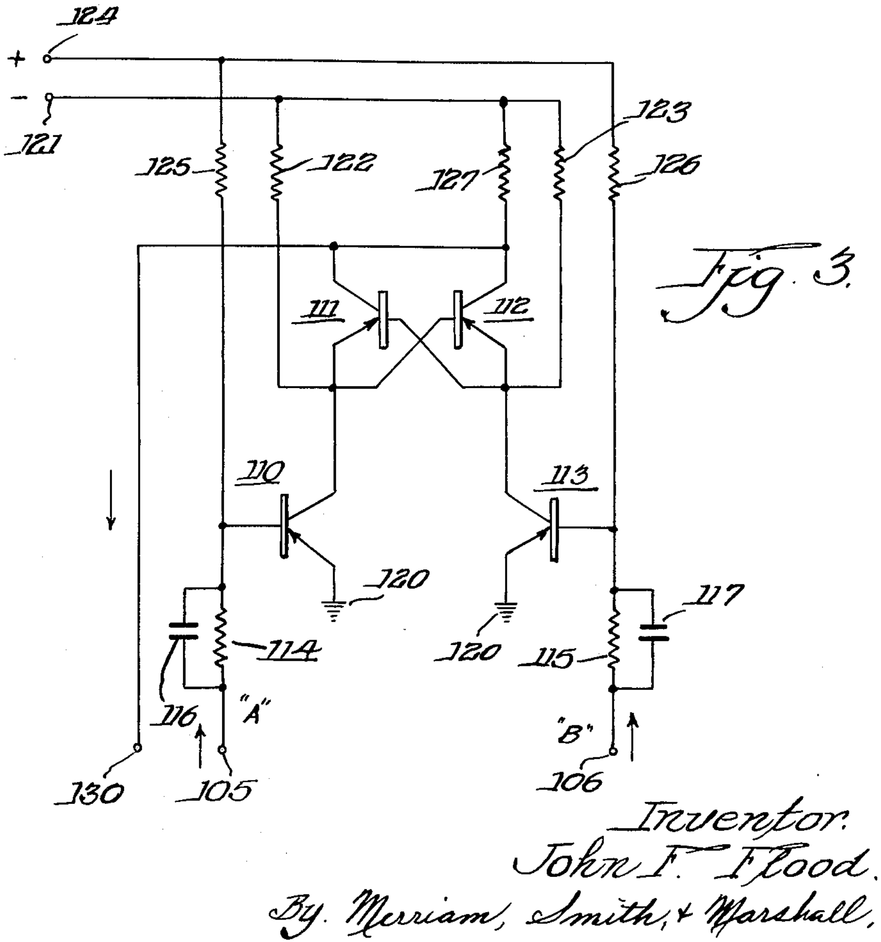
FIG. 3 is a circuit diagram representing an "exclusive-or" circuit type of the character preferred for use in connection with the diagrammatic showing of FIG. 2.

With this information available, reference may now be made to one form of the exclusive-or circuitry as shown in further detail by the circuit component diagrammatically represented in FIG. 3. Prior to making this reference, and considering the indicated circuitry, it may be assumed that the supplied information is either representative, say, of a steady condition indicating a signal of zero or equivalent steady amplitude of some finite value. Under such conditions, if one input signal to the exclusive-or circuit is considered as a signal "A" supplied at terminal point 105 and the second signal is considered as a signal "B" supplied at terminal 106, and if it further be considered that a signal input of steady value, such as zero or some other finite value but less than the second amplitude signal pulse above identified, is represented as a "0" and the signal which is a pulse of greater amplitude than the steady pulse is represented as "1," then the exclusive-or circuit output may be determined by a so-called truth table as follows:

| Exclusive-or Output | Input | |
|---|---|---|
| | A | B |
| 0 | 0 | 0 |
| 1 | 0 | 1 |
| 1 | 1 | 0 |
| 0 | 1 | 1 |

From the foregoing, it can be seen that the exclusive-or circuit provides output pulses of a value exceeding the steady pulse value at times when the input pulses "A" and "B" at terminals 105 and 106 are different, but when these pulses are of similar or the same amplitude, the output of the exclusive-or input is zero or a steady signal.

Considering the circuitry shown by FIG. 3, each exclusive-or circuit, such as 37 or 38 or the like, comprises a group of four transistor elements schematically represented at 110, 111, 112 and 113. The input signals as available at the terminals 105 and 106, are supplied to the base electrodes of each of the transistors 110 and 113 by way of resistors 114 and 115 which are bypassed by condensers 116 and 117, respectively. The emitter electrode of each of transistors 110 and 113 is grounded at a ground point 120. The colletcor electrodes of the transistors 110 and 113 are provided with negative bias potential relative to ground 120 by way of connection to terminal point 121 through resistors 122 and 123, respectively.

The collector electrodes of transistors 110 and 113 also are so connected that the collector of transistor 110 connects to the emitter of transistor 111 and to the base of transistor 112. The collector electrode of transistor 113 similarly connects to the emitter of transistor 112 and to the base of transistor 111. The base electrodes of transistors 110 and 113 are held at a suitable potential relative to ground 120 by way of the connection to terminal point 124 through resistors 125 and 126. Negative potential relative to ground is applied to the collector electrode of transistors 111 and 112 by their connection through the load resistor 127 to the terminal 121. Output signals are derived from the combination at the output terminal 130 which is supplied from the collectors of transistors 111 and 112.

The circuitry described by FIG. 3 is intended to illustrate a preferred form of the exclusive-or circuits, such as that of FIG. 2. Illustratively, the input available at input terminal 105 may be that available at terminal 26, while the input avaliable at the input terminal 106 may be that available at the input terminal 27 in FIG. 2. With the collector electrodes thus connected, it can be appreciated that if transistor 110 is non-conducting, the transistor 112 may conduct if the transistor 113 is conducting. Similarly, if the transistor 113 is non-conducting, then the transistor 111 may conduct if the transistor 110 is conducting.

From the foregoing, it will be apparent that if the input signals at terminals 105 and 106 are of the character above set forth, the conditions of the exclusive-or circuitry above outlined by the foregoing table will be met. The output signals available at the output terminal 130 will constitute a voltage level above some selected value if the inputs at terminals 105 and 106 differ. If the inputs at terminals 105 and 106 are of like character, there will be no output signal available at the terminal 130. It thus is possible to determine the signal pulses on any of the conductors 39, 40 or 131 through 138 in accordance with the foregoing premise, it being understood that terminal 130 schematically could illustrate the output available on any of the conductors stated for any given condition.

So considered, the outputs from the various exclusive-or circuits 37, 38 and 60 through 67 are supplied, as above noted, to one terminal 43 and 144 through 152 directly and to the second input control terminal 44 and 154 through 162, respectively, through inverter circuits 45 and 165 through 174, inclusive.

Figure 4:
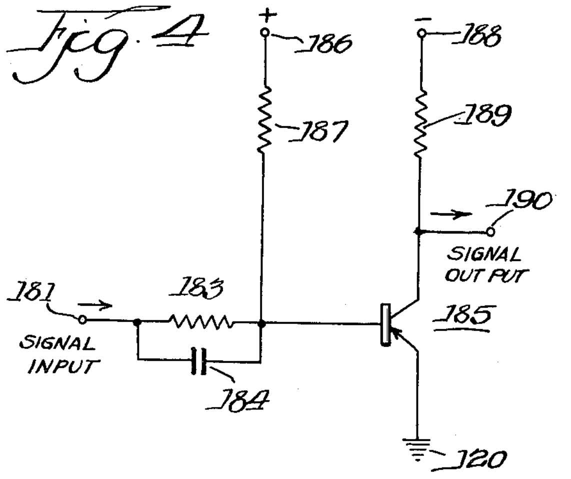
FIG. 4 is a circuit diagram showing one type of inverter circuit diagrammatically represented in FIG. 2.

Many and various forms of inverter circuits may be utilized, but one suitable form may be considered as that shown by FIG. 4. In the represented showing the input signal available at the signal input terminal 181, illustratively, may be that supplied by way of any of conductors 39, 40 and 131 through 138 and 180. So considered, the signal is supplied through a resistor 183, which is by-passed by the capacitor 184, to the base electrode of one of the inverting transistors schematically represented at 185. The base electrode of transistor 185 is supplied with a positive potential relative to ground 120 from terminal 186 by way of the resistor 187. The emitter electrode of the transistor 185 is grounded in well-known fashion. The collector electrode is supplied with negative potential relative to ground 120 from its connection to terminal 188 through its load resistor 189. Output signal voltages become available at the output terminal 190. This signal voltage (as is well known) is then 180° out-of-phase with that voltage applied to the input terminal 181. To this point in the circuit reference to FIG. 2 no mention has been made of the fact that the low-pass filter as depicted illustratively in FIG. 1 by the component 17 is included. However, for simplification of reference, and as purely illustrative of a form of filter which is usable in the circuitry represented, there has been shown in FIG. 2 suitable low-pass filter components which will be mentioned specifically in connection with the circuit of FIG. 6. The filters connect the output of the exclusive-or circuits 37, 38 and 60 through 67, inclusive, and the signal on the conductor 180 either directly or through the depicted inverters to the flip-flops. The particular type and form of the filter circuit may vary as desired, but essentially, the important factor is to provide generally a low-pass type of device which will remove noise and such uncertainties as oscillations from the signals carried to the load circuits.

Figure 5:
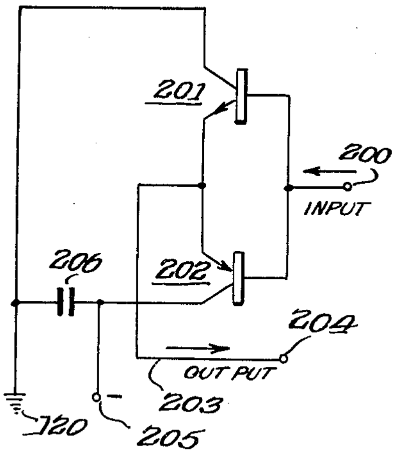
FIG. 5 is a circuit diagram representing one type of sample-command control circuit of FIG. 2 serving as controlled input trigger.

If reference is now made to FIG. 5, there has been illustrated a schematic arrangement of one suitable form of sample command circuit. In this form, a suitable input pulse may be assumed to be provided at an input terminal 200 to be supplied to the base electrodes of a pair of transistors 201 and 202. Transistor 201 of this pair is connected with its emitter as an emitter-follower to the emitter electrode of transistor 202. The junction whereat the emitter connects leads to conductor 203 and then to an output terminal 204. The collector electrode of transistor 201 is grounded at 120, while the collector electrode of transistor 202 is supplied with negative potential relative to ground from a source connected at a terminal 205. The collector of the transistor 202 is also provided with an A.C. ground through the condenser 206. With signal voltage input of appropriate character supplied at the input terminal 200, a suitable output signal is derived at the output 204 for triggering the flip-flop circuits next to be described in connection with the circuitry of FIG. 6.

Figure 6:
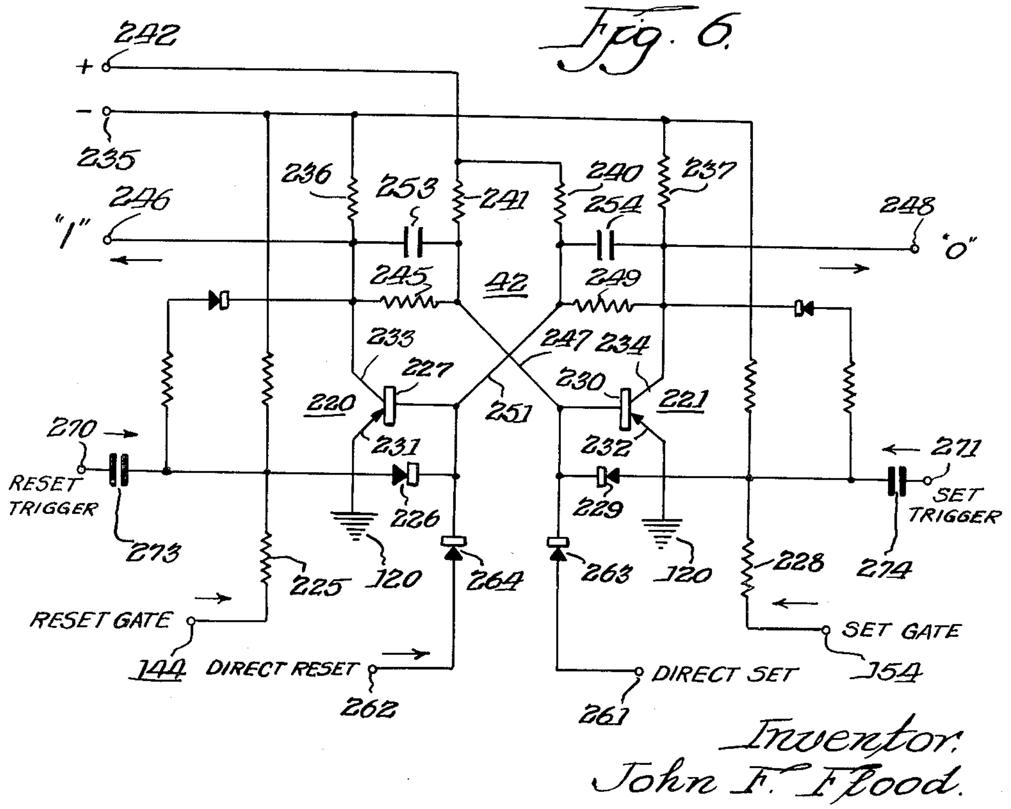
FIG. 6 is a circuit diagram of a preferred type of flip-flop circuit controlled by the outputs from the exclusive-or circuits and the inverters, as described by FIGS. 3 and 4, respectively.

When the signals from the exclusive-or circuits are supplied to the flip-flops either directly or through an inverter, the signal may be assumed, illustratively, to be supplied from conductor 40, for instance, directly to the input terminal 144 of the flip-flop 42, it being noted that the flip-flop 42 is considered illustratively in FIG. 6 as being representative of any of the flip-flops shown in FIG. 2. The inverted signal, which is supplied through the inverter 165, for instance, is then applied to the terminal 154 of the flip-flop, such as flip-flop 42. The input terminals 144 and 154 may, for instance, be designated as the reset gate terminal and the set gate terminal, respectively. These signals, as applied, are then caused to control the current passing state of the transistors 220 and 221 by reason of connection in the case of the signal available at terminal 144 (the reset gate terminal) through resistor 225 and diode 226 to the base 227. In the case of the signal available at the set gate 154 the control is through the resistor 228 and diode 229 to the base 230 of transistor 221.

It will be noted that each of transistors 220 and 221 has its emitter 231 or 232 grounded at 120. The collector electrodes 233 and 234 are supplied with negative bias potential relative to ground by connection to the terminal point 235 by way of the load resistors 236 and 237, respectively. The base electrodes 227 and 230 of these transistors are maintained at a normal state positive with respect to ground 120 by connection through resistors 240 and 241 to the terminal point 242.

To provide the flip-flop control, the control input voltages which is available at the input terminals 144 and 154 controls the current flowing through each of transistors 220 and 221. These transistors are cross-connected so that output signals from transistor 220, for instance, are available across its load resistor 245 at the output terminal point 246. These voltages are also supplied by the cross-connection 247 to the base electrode 230 of transistor 221. Similarly, output signals available at the output terminal 248, which are derived from the collector electrode 234 of the transistor 221 across its output resistor 249 are also supplied back to the base 227 of transistor 220 in well-known fashion by the cross-connection 251.

Output resistors 241 and 240 are by-passed in well-known fashion by condensers 253 and 254. Under these circumstances, with signals available at the terminals 144 and 154, which illustratively may be signals of zero voltages (for instance, for a "1" in a binary state or illustratively at −12 volts for a "0" state), the flip-flop is caused to move or shift between one operational state and the other.

The illustrated flip-flop circuit is one of a general purpose character having gated "set" and "reset" trigger inputs, as explained. In addition, there is provided a direct set and reset input adapted to be connected, respectively, at the terminals 261 and 262 which connect respectively to the base electrodes 230 and 227 of transistors 221 and 220 through the isolating diodes 263 and 264.

As becomes apparent from the showing of the schematic representation in FIG. 2, a reset pulse derived from conductor 47 is adapted to be supplied in parallel to the reset or set trigger, terminals 270 and 271 from which the signal pulse is caused to control the transistor operation in parallel. The input signals available at the terminals 270 and 271, respectively, are supplied through condensers 273 and 274 which, in combination with resistors 225 and 228 form a low-pass input filter of the character schematically designated in FIG. 1. This is essentially a control which serves as an analog signal component in series with any digital information supplied and the circuitry thus functions in the fashion schematically depicted by component 17 of FIG. 1.

In the control effected and triggered by pulses supplied from conductor 47 to terminal points 270 and 271, the state of operation of the flip-flop will be changed depending upon the supplied signal, that is, whether it is representative of a "0" or a "1" as in the stated table, whereby reflected binary information selected at the instant of triggering serves to provide the output information. As is evident from the table above, the binary information supplied is one which has known derivatives, such as a known rise time per selected time period, and this must be less than a pre-established maximum.

With the control provided by the triggering pulse, a conversion is provided into a cyclically varying binary signal which may be in any code of which only a single digit changes for any unit change in any selected number. In this sense, it is essential that the sampling of the parallel binary inputs shall be controlled in such a way that the input voltage must no change at a rate greater than some set maximum value in order that the proper and desired control of the output may be achieved.

When the changes in the impressed signals occur, the flip-flops 41, 42 and 50 through 58 serve to constitute storage elements because they are flip-flops held in one steady state of operation as first triggered. The storage time is controlled in accordance with the gating pulses supplied from the sample command so that all of the flip-flops are simultaneously subject to change. With the control as set out, the operation is such that only a single one of the flip-flops at any instant changes its operation. This being considered, the output at the terminals 81 through 91, inclusive, illustratively may represent from terminal 81 through terminal 90 to the power zero to nine, illustratively, and the terminal 91 will represent $2^{sign}$. These are units representing a "1" condition. The "0" condition, as represented by the signals available on conductors 92 through 102, may then be supplied to additional exclusive-or circuits of the type already explained and which are represented by the schematically represented circuitry 280 through 289.

As the connections are shown, it will be noted that the signal voltages applied via the conductor 92, for instance, will feed to one input of the exclusive-or circuit 281 which, for instance, would be a terminal point such as that diagrammatically shown at 105 in FIG. 3. The second input to the exclusive-or circuit, as at 281, will be derived by feeding back a part of the output from the next succeeding exclusive-or circuit, such as 282, of the parallel plurality, as can be seen in the showing of FIG. 2.

The other exclusive-or circuits shown are similar and further detailed reference need not be made with respect to this form of control. Suffice it to say that at the output of the several exclusive-or circuits 280 through 289, which outputs are then available at the output terminals 290 through 300, there is again binary information which may be handled in any desired manner to produce a plurality of signals from which any desired type of information may be reconstructed.

Various circuit modifications can readily be made and it is therefore to be understood that the invention defined by the claims to follow shall be broadly interpreted in the light of this disclosure.

What is claimed is:

1. A signal sampling circuit into which binary information is supplied in a plurality of parallel circuits individually representative of different powers of 2 between $2^0$ and $2^n$, where $n$ represents the number of bits into which selection is made, which comprises means to convert the binary signals in the parallel circuits into a reflected binary signal series in similarly arranged parallel circuits, a storage means connected to receive the reflected binary signal information asynchronously, means for triggering the storage means to release the stored information from the storage means simultaneously and synchronously in all parallel paths, analog-type filter means connected in each of the parallel digital circuit paths between the converting means and the storage means to filter high-frequency components from the information supplied to the storage means, and a load circuit to receive the storage output for conversion to a selected signal form.

2. A signal sampling circuit into which binary information is supplied in a plurality of parallel supply circuits individually representative of different powers of 2 between $2^0$ and $2^n$, where $n$ represents the number of bits into which selection is made, which comprises means to convert the binary signals in the parallel supply circuits into a reflected binary signal series in similarly arranged parallel circuits, an analog-type low-pass filter connected in each parallel circuit path to which the digital reflected binary information is supplied, a signal storage means connected to receive the reflected binary signal information asynchronously from the filters, means for triggering the storage means to release the information therein stored simultaneously and synchronously in all parallel signal paths, and means to connect a load circuit to supply the stored signal output for conversion to selected forms.

3. A signal converting circuit wherein signal information in binary form is supplied in a plurality of parallel input circuits individually representative of different powers of 2 between $2^0$ and $2^n$, where $n$ represents the number of bits into which selection is made, which comprises conversion circuits for converting the binary signals in the parallel circuits into reflected binary signals wherein at any instant a change in signal form occurs in one only of similarly arranged parallel circuits there being also a plurality of parallel output paths from the conversion circuits, an analog-type low-pass filter circuit included in each parallel output circuit path from the conversion circuit, a storage means connected to receive the reflected binary signals asynchronously from the filters, triggering means for the storage means to release synchronously and simultaneously the signal information in all parallel signal paths, and means to connect a load circuit to receive the simultaneously released storage output.

4. Signal conversion circuitry adapted to receive varying analog signal input voltages comprising means to convert the input analog information to binary information in a plurality of parallel circuit paths each developing output signal information which according to the presence and absence of voltage pulses is indicative of a different power of 2 ranging between $2^0$ and $2^n$, where $n$ represents the maximum number of bits into which the input analog signals are divided, comprising means to convert the binary signal information in each of the several parallel paths into reflected binary signal information in a like number of parallel circuit paths so that instantaneously there is a change between signal voltage presence and absence in one parallel path only, storage means to receive the reflected binary signal data from the plurality of parallel circuit paths asynchronously, an analog-type low-pass filter means included in each parallel circuit path between the signal converter means and the storage circuit, means to trigger the storage means to release simultaneously signal information determined by a parallelly supplied reflected binary information and means to connect a load circuit to the switching means to utilize the sampled information output.

5. Signal conversion circuitry adapted to receive varying analog signal input voltages comprising means to convert the input analog information to binary information in a plurality of parallel circuit paths each developing output signal information which according to the presence and absence of voltage pulses is indicative of a different power of 2 ranging between $2^0$ and $2^n$, where $n$ represents the maximum number of bits into which the input analog signals are divided, comprising means to convert the binary signal information in the several parallel paths into reflected binary signal information in a like number of parallel circuit paths so that instantaneously there is a change between signal voltage presence and absence in one parallel circuit path only, storage means to receive the reflected binary signal data from the plurality of parallel circuit paths asynchronously, a low pass filter connected in each parallel circuit between the signal converter means and the storage circuit, means to trigger the storage means to release signal information determined by the parallelly supplied reflected binary information so that all stored signal information is simultaneously released, and means to connect a load circuit to the switching means to utilize the sampled information output from the switching means.

References Cited by the Examiner

UNITED STATES PATENTS

| | | | |
|---|---|---|---|
| 2,762,563 | 9/56 | Samson et al. | 340—347 |
| 2,834,011 | 5/58 | Mork | 340—347 |
| 2,987,630 | 6/61 | Schreiner | 307—88.5 |
| 3,003,071 | 10/61 | Henle | 307—88.5 |
| 3,035,257 | 5/62 | Kretzmer | 340—347 |

OTHER REFERENCES

"Control System Synthesis," John G. Truxal, McGraw-Hill (1955), pp. 491–499 relied on.

MALCOLM A. MORRISON, *Primary Examiner.*